(12) United States Patent
Wang et al.

(10) Patent No.: US 11,249,235 B2
(45) Date of Patent: Feb. 15, 2022

(54) LIGHT GUIDE MODULE AND AUGMENTED REALITY APPARATUS HAVING THE SAME

(71) Applicant: Himax Display, Inc., Tainan (TW)

(72) Inventors: Chien-Tang Wang, Tainan (TW); Yuet-Wing Li, Tainan (TW)

(73) Assignee: Himax Display, Inc., Tainan (TW)

( * ) Notice: Subject to any disclaimer, the term of this patent is extended or adjusted under 35 U.S.C. 154(b) by 344 days.

(21) Appl. No.: 16/538,804

(22) Filed: Aug. 12, 2019

(65) Prior Publication Data
US 2021/0048574 A1  Feb. 18, 2021

(51) Int. Cl.
*G02B 6/00* (2006.01)
*F21V 8/00* (2006.01)
*G02B 27/01* (2006.01)

(52) U.S. Cl.
CPC ......... *G02B 6/0015* (2013.01); *G02B 6/0025* (2013.01); *G02B 6/0076* (2013.01); *G02B 27/0172* (2013.01); *G02B 2027/0178* (2013.01)

(58) Field of Classification Search
CPC ........ G02B 2027/0178; G02B 27/0172; G02B 6/0015; G02B 6/0025; G02B 6/0028; G02B 6/0038; G02B 6/0076
See application file for complete search history.

(56) References Cited

U.S. PATENT DOCUMENTS

| 8,059,342 | B2 | 11/2011 | Burke |
| 8,432,614 | B2 | 4/2013 | Amitai |
| 10,302,835 | B2 * | 5/2019 | Danziger ............. G02B 6/0016 |
| 2011/0109528 | A1 * | 5/2011 | Mun .................. G02B 27/0172 345/8 |
| 2019/0049739 | A1 * | 2/2019 | Choi ..................... G02B 6/005 |

FOREIGN PATENT DOCUMENTS

| CN | 208721896 U | 4/2019 |
| JP | 5545076 B2 | 7/2014 |
| TW | I595280 B | 8/2017 |

* cited by examiner

*Primary Examiner* — Joseph P Martinez
*Assistant Examiner* — Vipin Patel
(74) *Attorney, Agent, or Firm* — CKC & Partners Co., LLC

(57) ABSTRACT

A light guide module and an augmented reality (AR) apparatus are disclosed. The AR apparatus includes a display module and the light guide module. The light guide module includes a first light guide plate and a second light guide plate. The first light guide plate has a light receiving area for receiving optical input light with a predetermined incident angle and a light outputting area for outputting optical input light. The second light guide plate is disposed on the first light guide plate, and has dichroic surfaces for selectively transmitting or reflecting the optical input light.

19 Claims, 7 Drawing Sheets

LIGHT GUIDE MODULE AND AUGMENTED REALITY APPARATUS HAVING THE SAME

BACKGROUND

Technical Field

The invention relates to an optical field, and more particularly to a light guide module and an augmented reality (AR) apparatus having the same.

Description of Related Art

Augmented reality (AR) is a technology that places virtual objects on real-world scenes. With the AR technology, a user may interact with real and virtual contents. Nowadays AR devices, such as head-mounted displays (HMDs) and head-up displays (HUDs), have been used in various applications, including gaming, education, navigation, and so on. On the other hand, a smartglass is a type of HMD, in which a light guide module is needed for propagating light to its display area for a user to see virtual images.

SUMMARY

The objective of the invention is to provide a light guide module and an augmented reality (AR) apparatus using the same, in which the light guide module has dichroic surface for selectively transmitting or reflecting the optical input light, so as to achieve optical see-through.

One aspect of the invention relates to a light guide module which includes a first light guide plate and a second light guide plate. The first light guide plate has a light receiving area for receiving optical input light with a predetermined incident angle and a light outputting area for outputting optical input light. The second light guide plate is disposed on the first light guide plate, and has dichroic surfaces for selectively transmitting or reflecting the optical input light.

In one or more embodiments, the predetermined incident angle is substantially 70 degrees.

In one or more embodiments, refractive indexes of the first and second light guide plates are substantially the same.

In one or more embodiments, the optical input light is totally reflected internally on a surface of the second light guide plate far away from the first light guide plate.

In one or more embodiments, the light guide module further includes a third light guide plate disposed on the second light guide plate relative to the first light guide plate.

In one or more embodiments, the optical input light is totally reflected internally on a surface of the third light guide plate far away from the second light guide plate.

In one or more embodiments, the dichroic surfaces reflect light traveling from the third light guide plate and transmit light traveling from the first light guide plate.

In one or more embodiments, thicknesses of the first and third light guide plates are substantially the same.

In one or more embodiments, a sum of thicknesses of the first to third light guide plates is substantially 2 mm to 3 mm.

In one or more embodiments, the dichroic surfaces are arranged substantially in parallel with each other.

In one or more embodiments, a tilting angle of each of the dichroic surfaces is substantially a half of the predetermined incident angle.

In one or more embodiments, the dichroic surfaces are arranged at a predetermined pitch, and wherein the predetermined pitch is greater than or equal to $t \times \tan(\theta)$, where t is a thickness of the second light guide plate, and $\theta$ is the tilting angle of the dichroic surfaces.

In one or more embodiments, the light guide module further includes an input prism over the light receiving area of the first light guide plate.

Another aspect of the invention relates to an augmented reality (AR) apparatus which includes a display module and a light guide module. The display module is configured to provide optical input light. The light guide module includes a first light guide plate and a second light guide plate. The first light guide plate has a light receiving area for receiving the optical input light with a predetermined incident angle and a light outputting area for outputting optical input light. The second light guide plate is disposed on the first light guide plate, and has dichroic surfaces for selectively transmitting or reflecting the optical input light.

In one or more embodiments, the light guide module further includes a third light guide plate disposed on the second light guide plate relative to the first light guide plate.

In one or more embodiments, a sum of thicknesses of the first to third light guide plates is substantially 2 mm to 3 mm.

In one or more embodiments, the AR apparatus further includes a collimating member interposed between the display module and the light guide module.

In one or more embodiments, the display module is a front-lit liquid-crystal-on-silicon (LCoS) display module or a digital light processing (DLP) module.

In one or more embodiments, the AR apparatus further includes a body engaging the display module and the light guide module.

In one or more embodiments, the body is an eyeglass frame.

BRIEF DESCRIPTION OF THE DRAWINGS

Embodiments and advantages thereof can be more fully understood by reading the following description with reference made to the accompanying drawings as follows.

DETAILED DESCRIPTION

Figure 1:
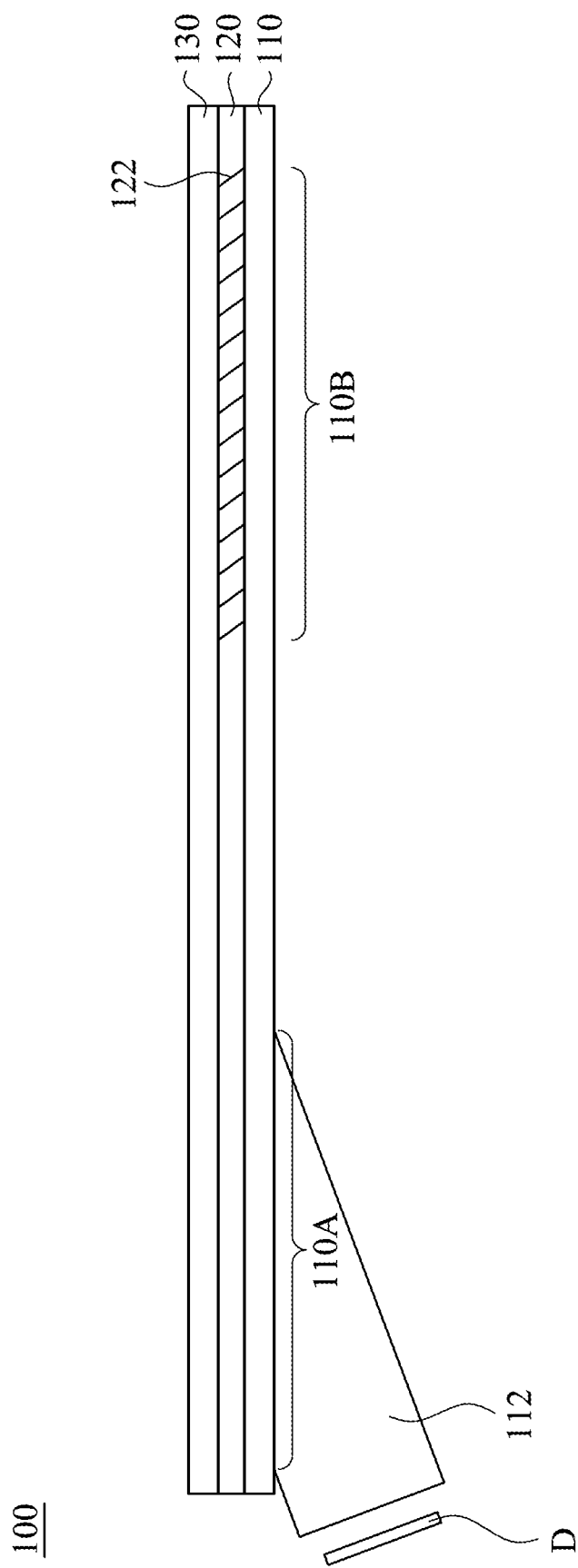
FIG. 1 is a cross sectional view of a light guide module in accordance with one or more embodiments of the invention.

The spirit of the disclosure is clearly described hereinafter accompanying with the drawings and detailed descriptions. After realizing preferred embodiments of the disclosure, any persons having ordinary skill in the art may make various modifications and changes according to the techniques taught in the disclosure without departing from the spirit and scope of the disclosure.

It will be understood that, although the terms "first," "second," "third" and so on may be used herein to describe various elements, components, areas, layers and/or portions, these elements, components, areas, layers and/or portions, should not be limited by these terms. These terms are only used to distinguish elements, components, areas, layers and/or portions.

Terms used herein are only used to describe the specific embodiments, which are not used to limit the claims appended herewith. Unless limited otherwise, the term "a," "an," "one" or "the" of the single form may also represent the plural form.

Further, the spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The document may repeat reference numerals and/or letters in the various examples. This repetition is for the purpose of simplicity and clarity and does not in itself dictate a relationship between the various embodiments and/or configurations discussed.

FIG. 1 is a light guide module 100 in accordance with one or more embodiments of the invention. The light guide module 100 includes stacked first to third light guide plates 110, 120, 130. The first light guide plate 110 has a light receiving area 110A for receiving optical input light and a light outputting area 110B for outputting optical input light. The optical input light penetrates into the first light guide plate 110 through the light receiving area 110A with a predetermined incident angle. The optical input light may be provided by a display D, such as a liquid-crystal-on-silicon (LCoS) display module (e.g. a front-lit LCoS display module), a digital light processing (DLP) module, a micro light-emitting diode (LED) display module, or another suitable display module. A further input prism 112 may be arranged over the light receiving area 110A for coupling the optical input light into the first light guide plate 110. Further, the input prism 112 may be aligned with the light receiving area 110A. The optical input light exits the first light guide plate 110 through the light outputting area 110B with a field of view (FoV). The refractive index of the first light guide plate 110 is equal to or greater than $1/\sin \theta$ for achieving total internal reflection, where $\theta$ is the predetermined incident angle of the optical input light.

The second light guide plate 120 is disposed on the first light guide plate 110, and has dichroic surfaces 122 for selectively transmitting or reflecting the optical input light. Each dichroic surface 122 may be made of, for example, a half mirror. The dichroic surfaces 122 are arranged substantially in parallel with each other, and a tilting angle of each dichroic surface 122 is about a half of the predetermined incident angle. Moreover, the dichroic surfaces 122 are arranged at a predetermined pitch greater than or equal to $t_{120} \times \tan(\theta)$, where $t_{120}$ is a thickness of the second light guide plate 120, and $\theta$ is the tilting angle of each dichroic surface 122.

The third light guide plate 130 is disposed on the second light guide plate 120 relative to the first light guide plate 110. Similarly, the refractive index of the third light guide plate 130 is equal to or greater than $1/\sin \theta$ for achieving total internal reflection, in order to prevent the optical input light from penetrating outside of the light guide module 100, where $\theta$ is the predetermined incident angle of the optical input light.

The refractive indexes of the first to third light guide plates 110, 120, 130 may be substantially the same. Moreover, in some embodiments, the thicknesses of the first light guide plate 110 and the third light guide plate 130 are substantially the same.

Each of the first light guide plate 110, the second light guide plate 120, the third light guide plate 130 and the input prism 112 may be made of an optical transparent material, such as glass, quartz, epoxy resin, polycarbonate resin, polymethyl methacrylate (PMMA), or the like. In some embodiments, the first light guide plate 110, the second light guide plate 120, the third light guide plate 130 and the input prism are of the same material.

Figure 2:
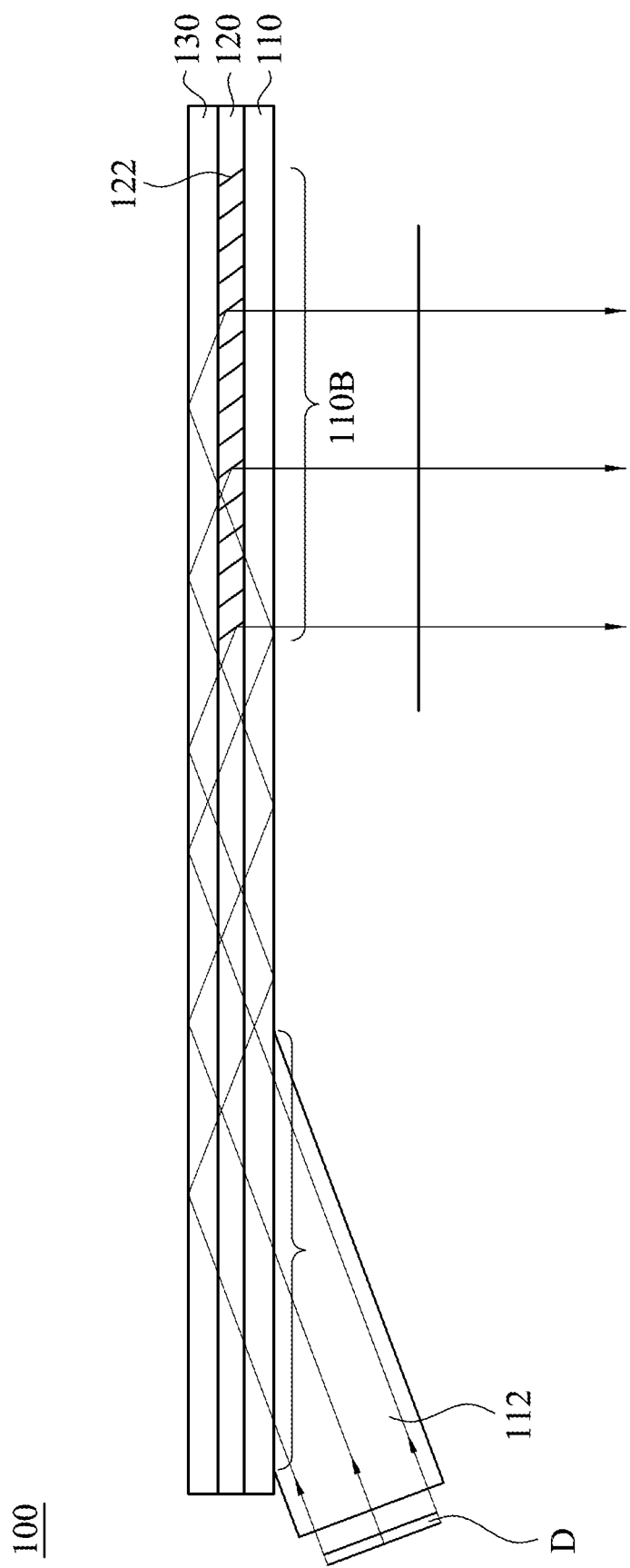
FIG. 2 exemplarily illustrates propagation of the optical input light in and outside the light guide module of FIG. 1.

FIG. 2 exemplarily illustrates propagation of the optical input light in and outside the light guide module 100. As shown in FIG. 2, the outer surfaces of the light guide module 100, i.e. the surface of the first light guide plate 110 far away from the second light guide plate 120 and the surface of the third light guide plate 130 far away from to the second light guide plate 120, except for the light receiving area 110A and the light outputting area 110B, reflect the optical input light in a manner of total internal reflection, such that the optical input light is propagated inside the light guide module 100 from the light receiving area 110A to the light outputting area 110B. The width of the light receiving area 110A is equal to or less than $2 \times t_{110} \times \tan(\theta)$, in order to avoid the optical input light back to the input prism 112, where $t_{110}$ is a thickness of the first light guide plate 110 and $\theta$ is the predetermined incident angle of the optical input light.

The light beams of the optical input light penetrating into the second light guide plate 120 or totally reflected internally on the surface of the third light guide plate 130 far away from the second light guide plate 120 substantially penetrate into the second light guide plate 120 and then penetrate into the third light guide plate 130. Some light beams traveling from the first light guide plate 110 may penetrate through the dichroic surfaces 122 toward the third light guide plate 130. Some light beams traveling from the third light guide plate 130 may be reflected by the dichroic surfaces 122 toward the first light guide plate 110, and then leave the first light guide plate 110 through the light outputting area 110B.

The light beams of the optical input light penetrating into the third light guide plate 130 are totally reflected internally on the surface of the third light guide plate 130 far away from the second light guide plate 120 and then penetrate into the third light guide plate 130.

The predetermined incident angle of the optical input light may be about 70 degrees, and the thickness of the light guide module 100 (i.e. a sum of thicknesses of the first to third light guide plates 110, 120, 130) may be about 2 mm to 3 mm for meeting the trend of miniaturization.

Figure 3:
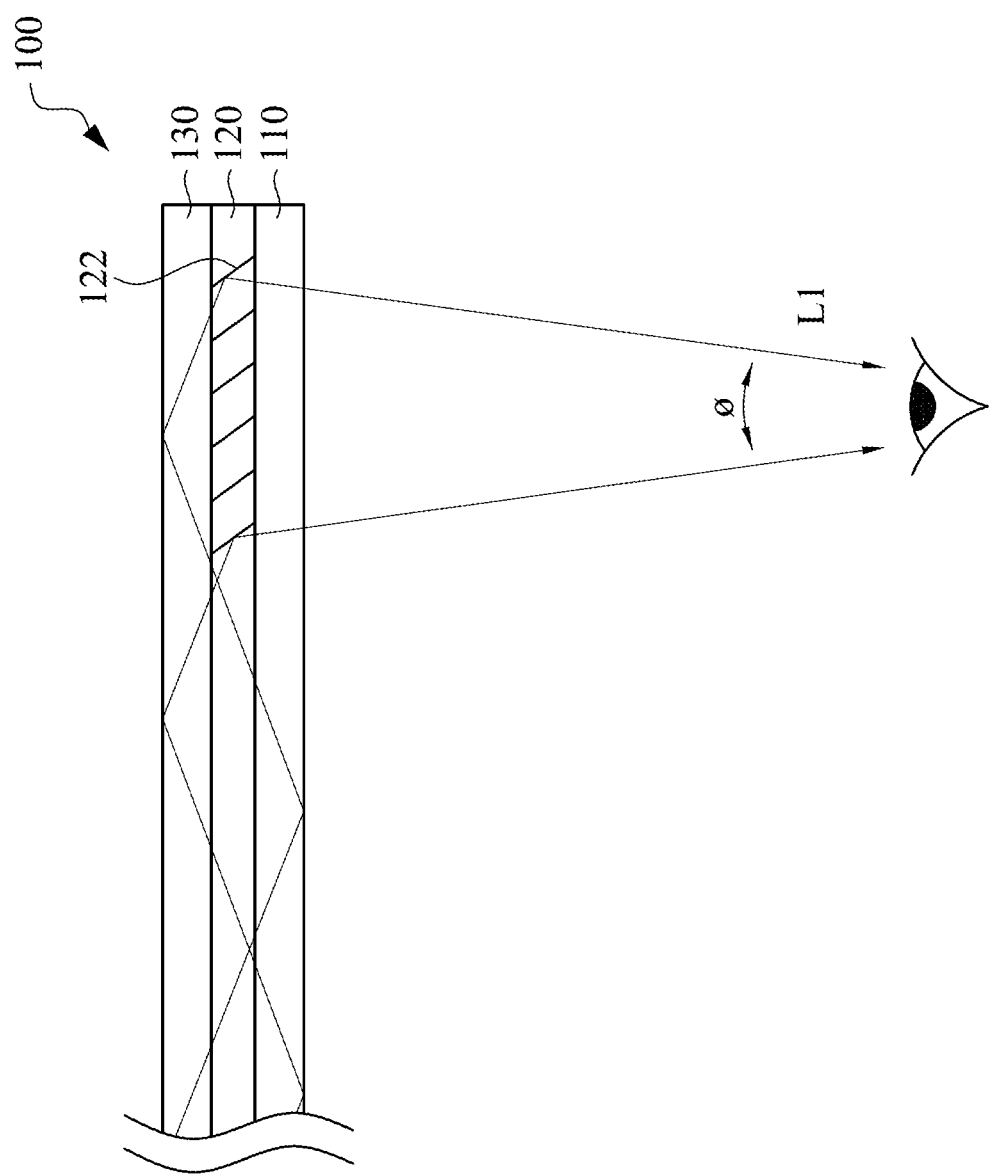
FIG. 3 is a detailed view of the illustration in FIG. 2.

FIG. 3 is a detailed view of the illustration in FIG. 2. In some examples, the refractive index of each of the first to third light guide plates 110, 120, 130 is about 1.517, the thickness of the first light guide plate 110 is about 0.5 mm, the second light guide plate 120 is about 1.1 mm, the third light guide plate 130 are about 0.5 mm, the predetermined incident angle is about 70 degrees, the tilting angle of each dichroic surface 122 is about 35 degrees, and the optical input light is from a collimating member with an efficient focal length of about 14.1 mm. The optical input light beam L1 are coupled inside the light guide module 100 and then outputted through the first light guide plate 110. With such configuration, the FOV $\phi$ achieves about 30 degrees.

Figure 4:
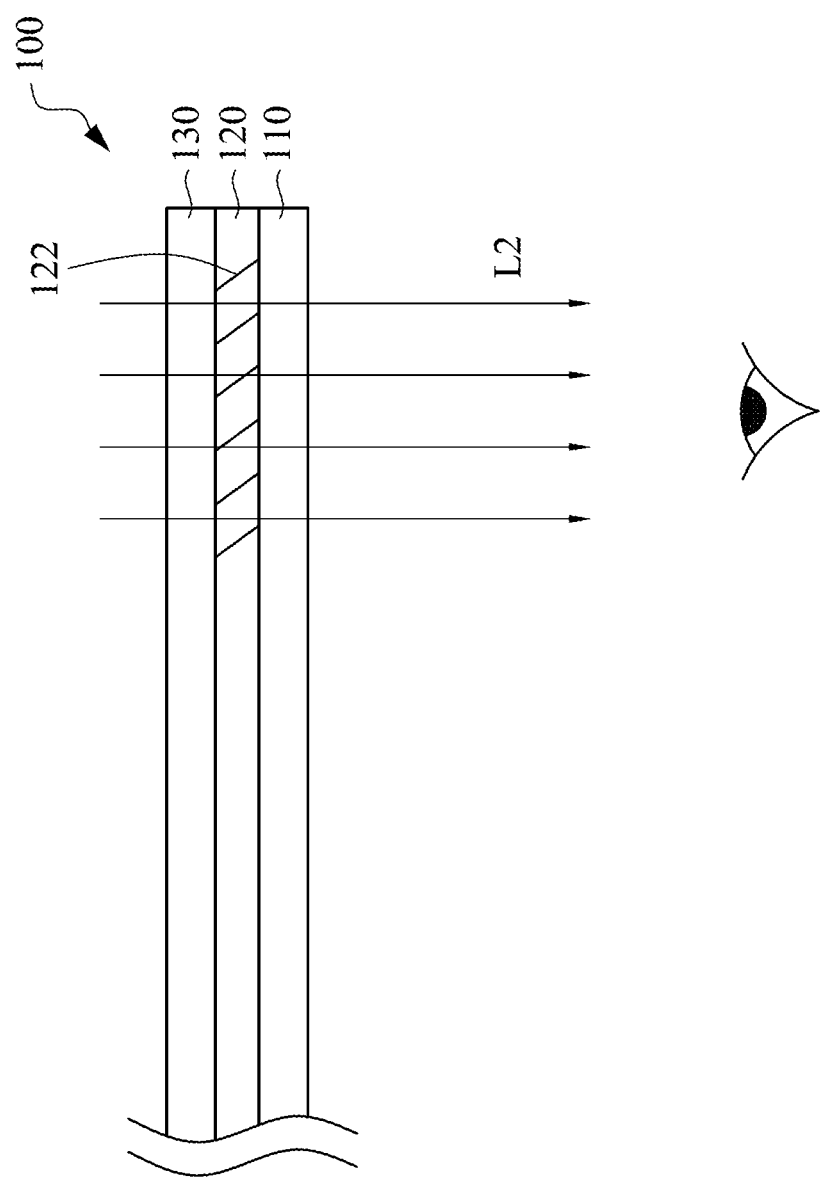
FIG. 4 exemplarily illustrates frontal light beams penetrating through the light guide module of FIG. 1.

FIG. 4 exemplarily illustrates frontal light beams penetrating through the light guide module 100. As shown in FIG. 4, the light beams L2 at the front side of the light guide module 100 may penetrate sequentially through the third light guide plate 130, the second light guide plate 120 and the first light guide plate 110 to the rear side of the light guide module 100.

Figure 5:
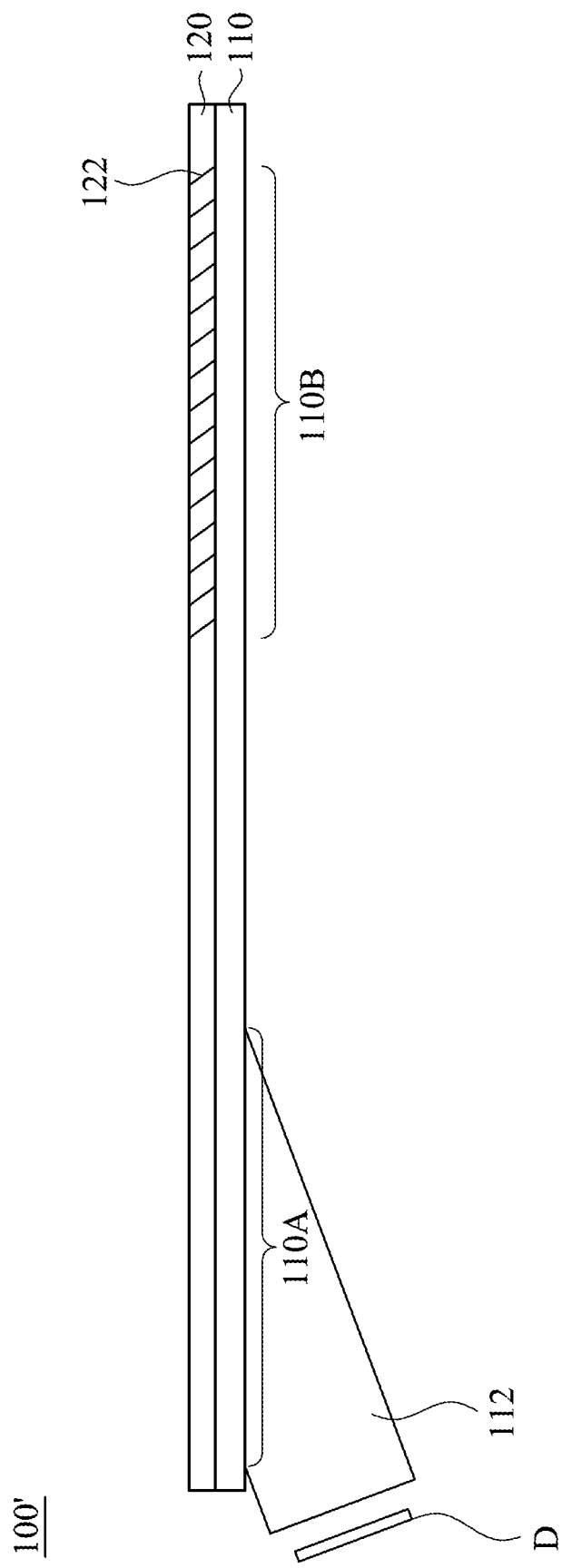
FIG. 5 is a cross sectional view of a light guide module in accordance with one or more embodiments of the invention.

FIG. 5 is a light guide module 100' in accordance with one or more embodiments of the invention. In comparison with the light guide module 100 in FIG. 1, the light guide module 100' includes the first light guide plate 110, the second light guide plate 120 and the input prism 112 but does not include the third light guide plate 130. In this case, the surface of the first light guide plate 110 far away from the second light guide plate 120 and the surface of the second light guide plate 120 far away from the first light guide plate 110, except for the light receiving area 110A and the light outputting area 1106, reflect the optical input light in a manner of total internal reflection, such that the optical input light is propagated inside the light guide module 100 from the light receiving area 110A to the light outputting area 1106. The other configurations of the first light guide plate 110, the second light guide plate 120 and the input prism 112 in the light guide module 100' may be similar to those in the light guide module 100, and thus are not repeated herein.

Figure 6:
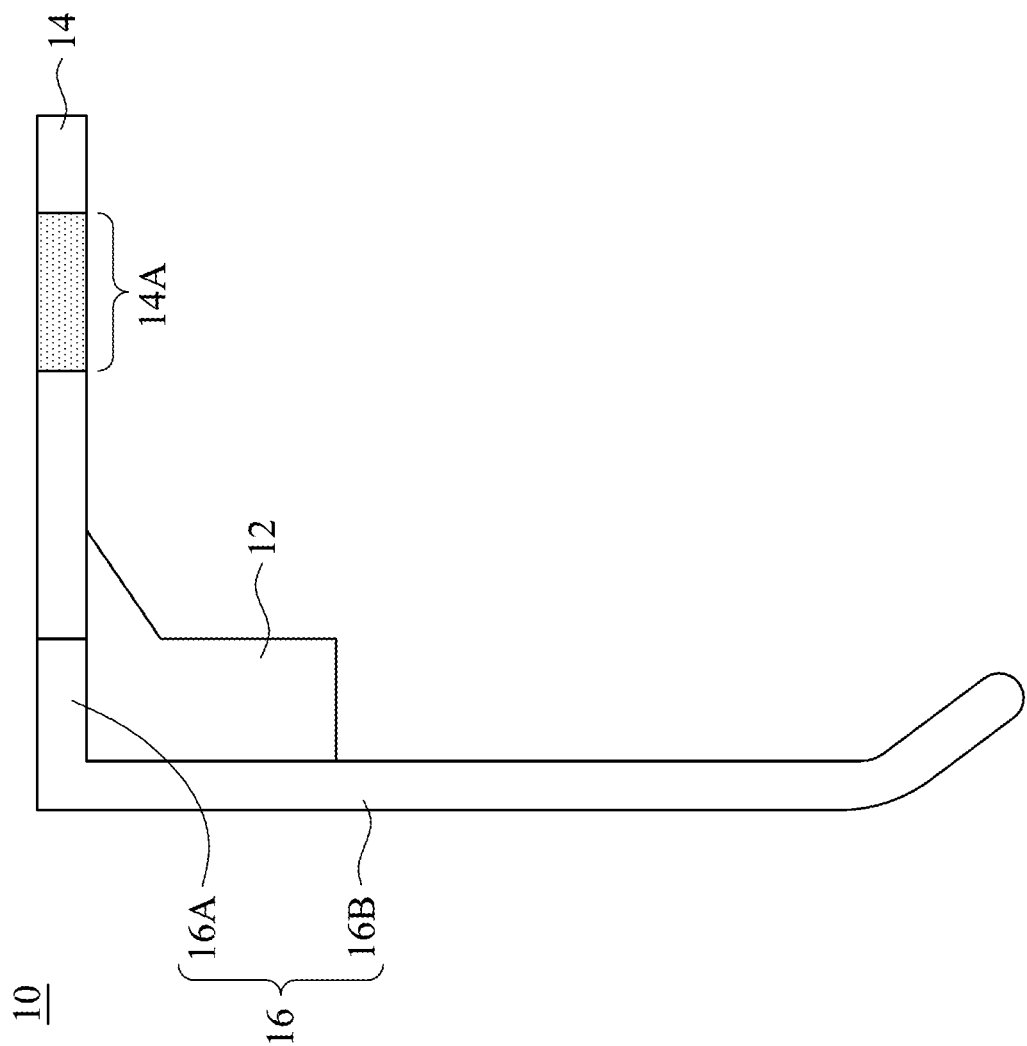
FIG. 6 is a schematic diagram of an augmented reality (AR) apparatus in accordance with one or more embodiments of the invention.

FIG. 6 is an exemplary augmented reality (AR) apparatus 10 in accordance with one or more embodiments of the invention. The AR apparatus 10 includes a display module 12, a light guide module 14 and a body 16. The display module 12 is configured to provide optical input light (e.g. emit an image beam) toward the light guide module 14, and the light guide module 14 couples the optical input light therein and then couple the optical input light out at an AR display area 14A thereof. The display module 12 may be, such as an LCoS display module, a DLP module, a micro LED display module, or another suitable display module. The light guide module 14 may be implemented as the light guide module 100 in FIG. 1, the light guide module 100' in FIG. 4, or the like. For example, if the light guide module 14 is implemented as the light guide module 100 in FIG. 1, the display module 12 emit an image beam into the light guide module 14 through the light receiving area 110A of the first light guide plate 110. The body 16 engages the display module 12 and the light guide module 14. In some embodiments, as shown in FIG. 6, the body 16 is an eyeglass frame. In this case, the body 16 has a frame front 16A that engages the light guide module and a temple 16B that engages the display module 12, and the AR apparatus 10 may be referred to as an optical see-through head-mounted device (HMD). That is, when the AR apparatus 10 is worn on a user's head, the user may see both the front real scene that penetrates through the light guide module 14 and the virtual image that is generated from the display module 12 and propagated in the light guide module 14. It is noted that FIG. 6 illustrates that the AR apparatus 10 corresponds to a left eye of a user, and one ordinary skilled in the art may readily understand that the AR apparatus 10 may be modified to correspond to a right eye or both eyes of a user.

The AR apparatus 10 may be applied not only to an HMD but also to other various applications. In some embodiments, the AR apparatus 10 is applied to a smartphone or a car, in which the body 16 may be, for example, a case of a smartphone or a car frame, but is not limited thereto.

In some embodiments, the AR apparatus 10 further includes a power supply (not shown) for providing power to the display module 14 and/or the other electrical components in the AR apparatus. The power supply may be embedded into the body 16 for appearance purposes. In addition, the power supply may be a rechargeable battery, a disposable battery, or another component suitable for providing power.

In some embodiments, the AR apparatus 10 further includes a microprocessor (not shown) for controlling the display module 12 to display (i.e. emit an image beam) according to its operation. the AR apparatus 10 may further include an input interface, such as a physical button or a touch panel, a communication interface, such as a wireless transceiver, and/or another suitable interface suitable for receiving data and/or operational commands.

Figure 7:
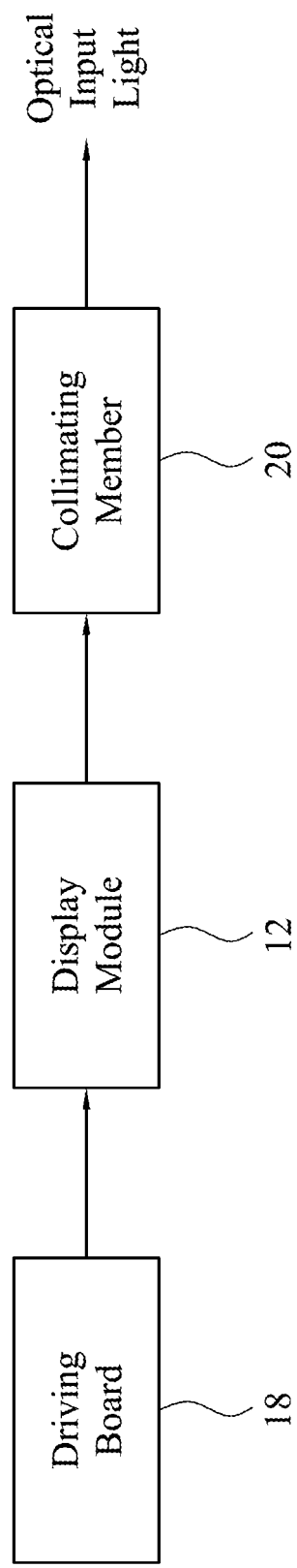
FIG. 7 is a functional block diagram of some elements of the AR apparatus in FIG. 6.

FIG. 7 is a block function diagram of some elements of the AR apparatus 10 shown in FIG. 6. The display module 12, the driving board 18 and the collimating member 20 may be assembled into a single module. In some embodiments, the display module 12 is mounted on the driving board 18, and the driving board 18 have a driver (not shown) for driving the display module 12 to display (i.e. emit an image beam). The collimating member 20 is interposed between the display module 12 and the light guide module 14 (not shown in FIG. 7), and may be formed of one or more reflective elements and/or reflective elements, such as a convex lens, a Fresnel lens, or the like.

Although the invention is described above by means of the implementation manners, the above description is not intended to limit the invention. A person of ordinary skill in the art can make various variations and modifications without departing from the spirit and scope of the invention, and therefore, the protection scope of the invention is as defined in the appended claims.

What is claimed is:

1. A light guide module, comprising:
   a first light guide plate having a light receiving area for receiving optical input light with a predetermined incident angle and a light outputting area for outputting optical input light; and
   a second light guide plate disposed on the first light guide plate, the second light guide plate having a plurality of dichroic surfaces for selectively transmitting or reflecting the optical input light,
   wherein the dichroic surfaces are arranged at a predetermined pitch, and the predetermined pitch is greater than or equal to $t \times \tan(\theta)$, where t is a thickness of the second light guide plate, and $\theta$ is a tilting angle of the dichroic surfaces.

2. The light guide module of claim 1, wherein the predetermined incident angle is formed based on the optical input light and a surface of the first light guide plate and is 70 degrees.

3. The light guide module of claim 1, wherein refractive indexes of the first and second light guide plates are substantially the same.

4. The light guide module of claim 1, wherein the optical input light is totally reflected internally on a surface of the second light guide plate far away from the first light guide plate.

5. The light guide module of claim 1, further comprising:
   a third light guide plate disposed on the second light guide plate relative to the first light guide plate.

6. The light guide module of claim 5, wherein the optical input light is totally reflected internally on a surface of the third light guide plate far away from the second light guide plate.

7. The light guide module of claim 5, wherein the dichroic surfaces reflect light traveling from the third light guide plate and transmit light traveling from the first light guide plate.

8. The light guide module of claim 5, wherein thicknesses of the first and third light guide plates are substantially the same.

9. The light guide module of claim 5, wherein a sum of thicknesses of the first to third light guide plates is substantially 2 mm to 3 mm.

10. The light guide module of claim 1, wherein the dichroic surfaces are arranged substantially in parallel with each other.

11. The light guide module of claim 1, wherein the tilting angle of each of the dichroic surfaces is substantially a half of the predetermined incident angle.

12. The light guide module of claim 1, further comprising:
an input prism over the light receiving area of the first light guide plate.

13. An augmented reality (AR) apparatus, comprising:
a display module configured to provide optical input light; and
a light guide module, comprising:
a first light guide plate having a light receiving area for receiving the optical input light with a predetermined incident angle and a light outputting area for outputting optical input light; and
a second light guide plate disposed on the first light guide plate, the second light guide plate having a plurality of dichroic surfaces for selectively transmitting or reflecting the optical input light,
wherein the dichroic surfaces are arranged at a predetermined pitch, and the predetermined pitch is greater than or equal to $t \times \tan(\theta)$, where t is a thickness of the second light guide plate, and $\theta$ is a tilting angle of the dichroic surfaces.

14. The AR apparatus of claim 13, wherein the light guide module further comprises a third light guide plate disposed on the second light guide plate relative to the first light guide plate.

15. The AR apparatus of claim 14, wherein a sum of thicknesses of the first to third light guide plates is substantially 2 mm to 3 mm.

16. The AR apparatus of claim 13, further comprising:
a collimating member interposed between the display module and the light guide module.

17. The AR apparatus of claim 13, wherein the display module is a liquid-crystal-on-silicon (LCoS) display module or a digital light processing (DLP) module.

18. The AR apparatus of claim 13, further comprising:
a body engaging the display module and the light guide module.

19. The AR apparatus of claim 18, wherein the body is an eyeglass frame.

* * * * *